US006731251B2

United States Patent
Chen

(12) 
(10) Patent No.: US 6,731,251 B2
(45) Date of Patent: May 4, 2004

(54) DEVICE FOR SUPPORTING TWO INTERFACES INCLUDING THE TV IMAGE CARD AND THE LCD PANEL IMAGE CARD

(75) Inventor: Yun-Ching Chen, Taipei (TW)

(73) Assignee: Via Technologies, Inc., Hsin-Tien (TW)

( * ) Notice: Subject to any disclaimer, the term of this patent is extended or adjusted under 35 U.S.C. 154(b) by 274 days.

(21) Appl. No.: 09/931,176

(22) Filed: Aug. 17, 2001

(65) Prior Publication Data

US 2002/0042858 A1 Apr. 11, 2002

(30) Foreign Application Priority Data

Oct. 6, 2000 (TW) ........................................ 89120967 A

(51) Int. Cl.⁷ ................................................ G09G 5/00
(52) U.S. Cl. ........................................ 345/3.1; 345/3.2
(58) Field of Search .......................... 710/305; 345/3.1, 345/3.2; 348/554, 555

(56) References Cited

U.S. PATENT DOCUMENTS 5,991,833 A * 11/1999 Wandler et al. ................. 710/52
6,340,959 B1 * 1/2002 Inamori ........................ 345/3.1
6,353,460 B1 * 3/2002 Sokawa et al. ............... 348/555

OTHER PUBLICATIONS

NVIDIA nForce Platform Processors, http://www.nvidi-a.com/view.asp?IO=nppa.*

* cited by examiner

Primary Examiner—Tom Sheng
(74) Attorney, Agent, or Firm—Rabin & Berdo, P.C.

(57) ABSTRACT

A device for supporting two interfaces including a TV image card and a LCD panel image card is disclosed. The device can be inserted by the TV or the LCD panel image card according to the user's different needs. The device utilizes the built-in graphic capability of the North Bridge for supporting the TV or the LCD panel image output. By using the device of the invention, it is not necessary to design different motherboards for meeting clients' different demands. Furthermore, no image card is required according to the invention, and thus corresponding costs decrease.

20 Claims, 1 Drawing Sheet

DEVICE FOR SUPPORTING TWO INTERFACES INCLUDING THE TV IMAGE CARD AND THE LCD PANEL IMAGE CARD

This application incorporates by reference Taiwanese application Serial No. 89120967, filed Oct. 6, 2000.

BACKGROUND OF THE INVENTION

1. Field of the Invention

The present invention relates to a device for inserting a TV or a LCD panel image card. More particularly, the invention provides a slot mounted on a motherboard for inserting a TV or a LCD panel image card.

2. Description of the Related Art

As technology goes far than ever, not only is a cathode ray tube used for display of image outputs for a computer, but also a liquid crystal display (LCD) panel can be used for image display. A conventional North Bridge chip set does not integrate with a graphic function, and therefore another image or display card is required for supporting functions of a TV-OUT and a LCD-OUT. In decades, the graphic capabilities are gradually integrated into the North Bridge and therefore a TV or a LCD panel image processing circuit can be installed on the motherboard in nowaday technology. Namely, the motherboard has the TV-OUT and the LCD-OUT functions without using additional image card, for reducing cost.

However, a drawback mounting the TV or the LCD panel image processing circuit on the motherboard is that only one of them can be installed. Because output pins of the North Bridge are multi-function pins, they can only output signals for the TV or the LCD panel image at the same time. Namely, if the TV image processing circuit is installed on the motherboard, the LCD panel image processing circuit cannot be installed on the motherboard any more. On the other hand, if the LCD panel image processing circuit is installed on the motherboard, the TV image processing circuit cannot be installed on the motherboard, too. Therefore, when the user uses such a motherboard, the user can only choice TV or LCD panel as a secondary display in addition to the CRT monitor. The user has to buy two kinds of motherboards for matching the TV or LCD panel display. This increases additional expense for the users, and motherboard design, test and manufacturing costs increase as well.

There is another way for solving such a problem that the TV or the LCD panel image processing circuit is installed on an existed image card. The image card further includes an image controller for generating signals for the TV or the LCD panel display, such as a LCD panel or TV data signal FPD/TVD, a LCD panel or TV vertical synchronic signal FPVS/TVVS, a LCD panel or TV horizontal synchronic signal FPHS/TVHS, and a clock signal CLK, etc. The image card only receives graphic data signals and corresponding control signals from the North Bridge. Meanwhile, the graphic capability of the North Bridge is disabled, and only the graphic capability of the external image card is used. Therefore, the graphic ability of the North Bridge cannot be fully exploited. Furthermore, because only one image processing circuit, for TV or LCD panel, can be installed on the motherboard, the user has to choice an image card having a TV or a LCD panel image processing circuit thereon according to the user's needs. Namely, the user has to buy an image card having a TV image processing circuit and another image card having LCD panel image processing circuit for supporting the TV or the LCD panel output, which increases costs.

SUMMARY OF THE INVENTION

Accordingly, it is an objective of the present invention to provide a device for supporting two interfaces including a TV image card and a LCD panel image card. The device can be inserted by the TV or the LCD panel image card according to the user's different needs. The invention utilizes the built-in graphic capability of the North Bridge for supporting the TV or the LCD panel image output. By using the device of the invention, it is not necessary to design different motherboards for meeting clients' different demands. Furthermore, no image card is required according to the invention, and thus corresponding costs decrease.

According to the object of the invention, the invention provides a device for inserting a first image card or a second image card. The device is located on a motherboard and electrically connected to a North Bridge with a graphic capability, wherein the first image card has a first image processing circuit for outputting a first image signal and the second image card has a second image processing circuit for outputting a second image signal. The North Bridge has a plurality of multi-function pins for at least outputting a first data signal, a second data signal, a first vertical signal, a second vertical signal, a first horizontal signal, a second horizontal signal and a clock signal, and the multi-function pins are electrically connected to the devices through a plurality of traces.

According to another object of the invention, the invention provides a motherboard. The motherboard comprises at least a North Bridge with a graphic capability; and a slot electrically connected to the North Bridge, for inserting a first image card or a second image card, wherein the first image card has a first image processing circuit for outputting a first image signal and the second image card has a second image processing circuit for outputting a second image signal. The North Bridge comprises a plurality of multi-function pins for at least outputting a first data signal, a second data signal, a first vertical signal, a second vertical signal, a first horizontal signal, a second horizontal signal and a clock signal, and the multi-function pins are electrically connected to the devices through a plurality of traces.

According to still another object of the invention, the invention provides a device for inserting an image card. The device is located on a motherboard and electrically connected to a North Bridge with a graphic capability, wherein the image card has an image processing circuit for outputting an image signal. The North Bridge comprises a plurality of pins for at least outputting a data signal, a vertical signal, a horizontal signal, and a clock signal, and the pins are electrically connected to the devices through a plurality of first traces.

BRIEF DESCRIPTION OF THE DRAWINGS

Other objects, features, and advantages of the invention will become apparent from the following detailed description of the preferred but non-limiting embodiments. The description is made with reference to the accompanying drawings in which.

DESCRIPTION OF THE PREFERRED EMBODIMENTS

Aspects of the present invention include methods and apparatus for designing an integrated circuit. In the following description, specific information is set forth to provide a thorough understanding of the present invention. Well-known circuits and devices are included in block diagram form in order to not to complicate the description unnecessarily. Moreover, it will be apparent to one skill in the art that specific details of these blocks are not required in order to practice the present invention.

According to the invention, a slot for inserting a television (TV) image card or a liquid crystal display (LCD) panel image card has to work together with the TV or LCD panel image card, as well as a control chipset having a graphic capability. For example, a North Bridge having a graphic capability can be used. The slot of the invention can be applied to both of the TV and the LCD panel image cards. The TV image card has a TV image processing circuit thereon, and the LCD panel image card has a LCD panel image processing circuit thereon.

The North Bridge having the graphic capability is capable of outputting various signals for displaying images for a CRT, TV, or LCD panel. These signals comprises analogue red (R), green (G) and blue (B) image signals, a vertical synchronic signal VSYNC and a horizontal synchronic signal HSYNC for the CRT. In addition, the North Bridge further comprises a number of multi-function pins for transmitting a LCD panel or TV data signal FPD/TVD, a LCD panel or TV vertical synchronic signal FPVS/TVVS, a LCD panel or TV horizontal synchronic signal FPHS/TVHS, and a clock signal CLK, etc, to the TV, or LCD panel image processing circuit. The North Bridge can further output a variety of signals specified for the TV and LCD panel image processing circuits.

Figure 1:
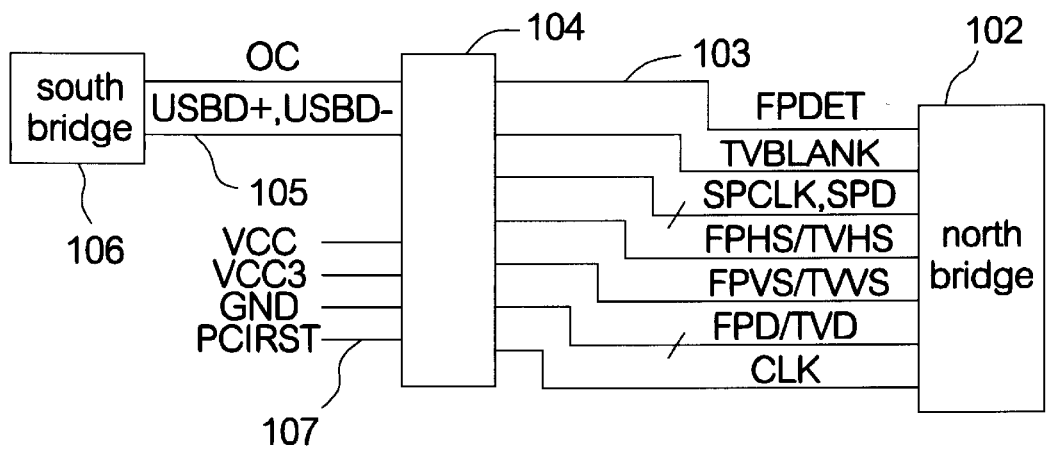
FIG. 1 is a schematic block diagram of a slot suitable for inserting a TV or a LCD panel image card according to one preferred embodiment of the invention.

FIG. 1 is a schematic block diagram of a slot suitable for inserting a TV or a LCD panel image card according to one preferred embodiment of the invention. The LCD panel or TV data signal FPD/TVD, the LCD panel or the TV vertical synchronic signal FPVS/TVVS, the LCD panel or the TV horizontal synchronic signal FPHS/TVHS, and the clock signal CLK are transmitted through a number of multi-function pins (not shown) of the North Bridge 102 via traces 103 to the slot 104. An over current (OC) protection signal pin and universal serial bus data signal pins USBD+, USBD− of the South Bridge 106 are connected to the slot 104 via a number of traces 105. In addition, the slot 104 is further connected to power sources having different voltages VCC, VCC3, a ground GND and a PCI reset signal PCIRST via traces 107.

The operation of the multi-function pins of the North Bridge 102 is discussed in detail as follows. The North Bridge 102 determines output signals corresponding to the type of an image card inserted to the slot 104. For example, the multi-function pins of the North Bridge 102 output the TV data signal TVD, the TV vertical synchronic signal TVVS, and the TV horizontal synchronic signal TVHS, etc, if the TV image card is inserted into the slot 104; and the multi-function pins of the North Bridge 102 output the LCD panel data signal FPD, the LCD panel vertical synchronic signal FPVS, the LCD panel horizontal synchronic signal FPHS, etc if the LCD panel image card is inserted into the slot 104. In regard to the FPD/TVD pin for example, the North Bridge 102 can only output the TV data signal TVD or the LCD panel data signal FPD.

The slot 104 is used for inserting a TV image card or a LCD panel image card. The TV image card has a TV image processing circuit thereon for receiving signals transmitted from the North Bridge 102 and then outputting appropriate image signals and control signals for TV display. Similarly, the LCD panel image card has a LCD panel image processing circuit thereon for receiving signals transmitted from the North Bridge 102 and then outputting appropriate image signals and control signals for TV display.

The invention differs from the conventional one in many aspects. In the conventional method, when an image card slot for inserting an image card having a TV or a LCD panel image processing circuit thereon is mounted on a motherboard, only the pins of control signals involving with graphic data of the North Bridge are connected to the slot via traces. The other signals for generating TV or LCD panel image signals, such as the LCD panel data signal FPD, the TV data signal TVD, the LCD panel vertical synchronic signal FPVS, the TV vertical synchronic signal TVVS, the LCD panel horizontal synchronic signal FPHS, the TV horizontal synchronic signal TVHS, and the clock signal CLK, are generated by the image card.

In contrast, according to the invention, in the North Bridge, the multi-function pins for generating the LCD panel or TV data signal FPD/TVD, the LCD panel or TV vertical synchronic signal FPVS/TVVS, the LCD panel or TV horizontal synchronic signal FPHS/TVHS, and the clock signal CLK are connected to the slot 104 via traces 103 the slot 104. Therefore, the pin-connection configuration of the slot to the North Bridge of the invention is completely different from the conventional pin-connection configuration of the image card slot.

Figure 2:
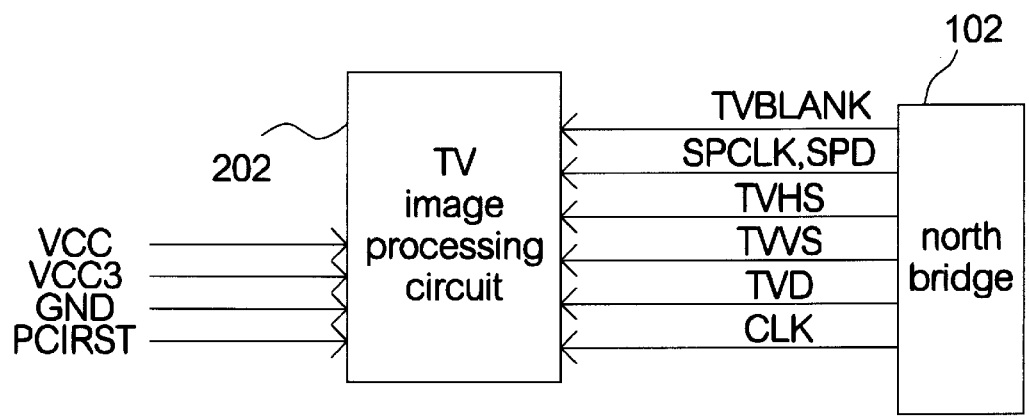
FIG. 2 is a schematic block diagram shown a connection between the TV image processing circuit and the North Bridge when the TV image card is inserted into the slot.

FIG. 2 is a schematic block diagram shown a connection between the TV image processing circuit and the North Bridge when the TV image card is inserted into the slot. When the TV image card is inserted into the slot 104, the TV image processing circuit 202 on the TV image card is used for receiving signals from the North Bridge 102 or the motherboard and then outputting TV image signals for supporting TV image display. The TV image processing circuit 202 receives the TV data signal TVD, the TV vertical synchronic signal TVVS, the TV horizontal synchronic signal TVHS, the clock signal CLK, the specification detection clock signal SPCCLK, specification data detection signal SPD, and TV blank signal TVBLANK from the North Bridge 102, and receives the power sources having different voltages VCC, VCC3, the ground GND and the PCI reset signal PCIRST from the motherboard. The specification detection clock signal SPCCLK, specification data detection signal SPD are used for detecting the TV hardware specification data.

Figure 3:
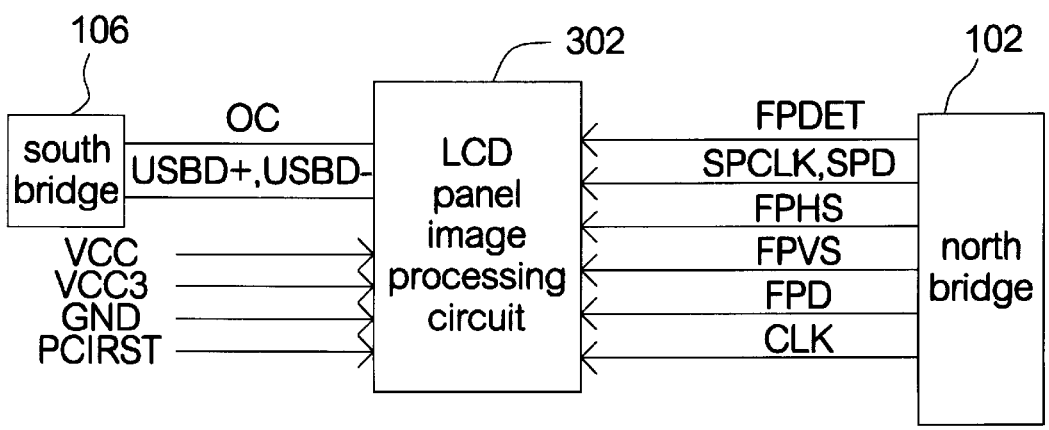
FIG. 3 is a schematic block diagram shown a connection between the LCD panel image processing circuit and the North Bridge when the LCD panel image card is inserted into the slot.

FIG. 3 is a schematic block diagram shown a connection between the LCD panel image processing circuit and the North Bridge when the LCD panel image card is inserted into the slot. When the LCD panel image card is inserted into the slot 104, the LCD panel image processing circuit 302 on the LCD panel image card is used for receiving signals from the North Bridge 102 or the motherboard and then outputting LCD panel image signals for supporting LCD panel image display. The LCD panel image processing circuit 302 receives the LCD panel data signal FPD, the LCD panel vertical synchronic signal FPVS, the LCD panel horizontal synchronic signal FPHS, the clock signal CLK, the specification detection clock signal SPCCLK, and the specification data detection signal SPD from the North Bridge 102, and receives the power sources having different voltages VCC, VCC3, the ground GND and the PCI reset signal PCIRST from the motherboard. The LCD panel image processing circuit 302 further outputs an LCD panel detection signal FPDET to the North Bridge 102. The specification detection clock signal SPCCLK, specification data detection signal SPD are used for detecting the LCD panel hardware specification data.

In addition, the LCD panel image processing circuit 302 can further receive the over current (OC) protection signal and the universal serial bus data signals USBD+, USBD− from the South Bridge 106 for supporting LCD panel image card having USB output port.

When booting, the BIOS detects whether the TV or the LCD panel image card is inserted into the slot 104, and then the BIOS setup is completed. The North Bridge 102 transmits signals for the TV or the LCD panel image card through the multi-function according to the BIOS settings.

In addition, the slot 104 can use an existed audio modem riser (AMR) by redefining its pins for complying with the TV or the LCD panel outputs. The AMR slot is first rotated by 180 degrees and then mounted on the motherboard for distinction from the conventional AMR slot, thereby users cannot insert the TV or the LCD panel image card into the conventional AMR slot for preventing form mis-installation causing that the TV or the LCD panel image card cannot output images properly.

In summary, the invention provides a slot for inserting a TV or a LCD panel image card. The slot can be inserted by the TV or the LCD panel image card according to the user's different needs. The invention utilizes the built-in graphic capability of the North Bridge for supporting the TV or the LCD panel image output. By using the slot of the invention, it is not necessary to design different motherboards for meeting clients' different demands. Furthermore, no image card is required according to the invention, and thus corresponding costs decrease.

While the invention has been described by way of example and in terms of the preferred embodiment, it is to be understood that the invention is not limited to the disclosed embodiment. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A device for supporting two interfaces including a first image card and a second image card, located on a motherboard and electrically connected to a North Bridge with a graphic capability, wherein said first image card has a first image processing circuit for outputting a first image signal, and said second image card has a second image processing circuit for outputting a second image signal; and
   wherein said North Bridge has a plurality of multi-function pins for at least outputting a first data signal, or a second data signal, a first vertical signal, or a second vertical signal, a first horizontal signal, or a second horizontal signal and a clock signal, and said multi-function pins are electrically connected to said device through a plurality of traces.

2. The device of claim 1, wherein said first image card is a television image card.

3. The device of claim 1, wherein said second image card is a liquid crystal display panel image card.

4. The device of claim 1, wherein said device is further electrically connected to a South Bridge.

5. The device of claim 1, wherein said device is an audio modem riser (AMR) slot.

6. The device of claim 5, wherein said AMR slot is first rotated by 180 degrees and then mounted on said motherboard.

7. A motherboard, comprising:
   a North Bridge with a graphic capability; and
   a slot electrically connected to said North Bridge, for inserting one of a first image card and a second image card, wherein said first image card has a first image processing circuit for outputting a first image signal and said second image card has a second image processing circuit for outputting a second image signal; and
   wherein said North Bridge comprises a plurality of multi-function pins for at least outputting a first data signal, or a second data signal, a first vertical signal, or a second vertical signal, a first horizontal signal, or a second horizontal signal, and a clock signal, and said multi-function pins are electrically connected to said slot through a plurality of traces.

8. The motherboard of claim 7, wherein said first image card is a television image card.

9. The motherboard of claim 7, wherein said second image card is a liquid crystal display panel image card.

10. The motherboard of claim 7, wherein said slot is further electrically connected to a South Bridge.

11. The motherboard of claim 1, wherein said slot is an audio modem riser (AMR) slot.

12. The motherboard of claim 11, wherein said AMR slot is first rotated by 180 degrees and then mounted on said motherboard.

13. A device for inserting an image card, said device being located on a motherboard and electrically connected to a North Bridge with a graphic capability, wherein said image card has an image processing circuit for outputting an image signal;
   wherein said North Bridge comprises a plurality of pins for at least outputting a data signal, a vertical signal, a horizontal signal, and a clock signal, and said pins are electrically connected to said devices through a plurality of first traces.

14. The device of claim 13, wherein said pins are multi-function pins.

15. The device of claim 13, wherein said image card is one of a television image card and a liquid crystal display (LCD) panel image card.

16. The device of claim 15, wherein when said image card is said television image card, said data signal is a television data signal, said vertical signal is a television vertical signal, and said horizontal signal is a television horizontal signal.

17. The device of claim 15, wherein when said image card is said LCD panel image card, said data signal is a LCD panel data signal, said vertical signal is a LCD panel vertical signal, and said horizontal signal is a LCD panel horizontal signal.

18. The device of claim 17, wherein when said image card is said LCD panel image card, said device is electrically connected to a South Bridge, and pins of said South Bridge for outputting a over current signal, a first and a second universal serial bus data signals are connected to said device through a plurality of second traces.

19. The device of claim 13, wherein said device is an audio modem riser (AMR) slot.

20. The device of claim 19, wherein said AMR slot is first rotated by 180 degrees and then mounted on said motherboard.

* * * * *